United States Patent
Wada

(10) Patent No.: US 11,054,263 B2
(45) Date of Patent: Jul. 6, 2021

(54) ROUTE SETTING DEVICE, AUTOMATIC PILOT, AND METHOD OF SETTING ROUTE

(71) Applicant: Furuno Electric Co., Ltd., Nishinomiya (JP)

(72) Inventor: Tomoo Wada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 101 days.

(21) Appl. No.: 16/197,062

(22) Filed: Nov. 20, 2018

(65) Prior Publication Data

US 2019/0154450 A1 May 23, 2019

(30) Foreign Application Priority Data

Nov. 22, 2017 (JP) .............................. JP2017-224131

(51) Int. Cl.
*G01C 21/20* (2006.01)
*B63B 49/00* (2006.01)
*G06F 3/0488* (2013.01)
*G05D 1/02* (2020.01)
*G06F 3/0484* (2013.01)

(52) U.S. Cl.
CPC ............ *G01C 21/203* (2013.01); *B63B 49/00* (2013.01); *G01C 21/20* (2013.01); *G05D 1/0206* (2013.01); *G05D 1/0274* (2013.01); *G06F 3/0488* (2013.01); *G06F 3/04883* (2013.01); *G06F 3/04847* (2013.01)

(58) Field of Classification Search
CPC ............................ G01C 21/203; G06F 3/0488
See application file for complete search history.

(56) References Cited

U.S. PATENT DOCUMENTS

| 9,157,750 B2 * | 10/2015 | Miichi ............... G01C 21/3664 |
| 2006/0089794 A1 * | 4/2006 | DePasqua ............ G01C 21/203 701/532 |
| 2017/0370724 A1 * | 12/2017 | Hovland ................. B63B 49/00 |
| 2018/0058863 A1 * | 3/2018 | Meyer ................ G01C 21/3682 |

FOREIGN PATENT DOCUMENTS

JP          2004333464 A     11/2004

OTHER PUBLICATIONS

Machine translation for application JP2004333464, Chin Kunie, Nov. 25, 2004.*

* cited by examiner

*Primary Examiner* — Anne Marie Antonucci
*Assistant Examiner* — Abdalla A Khaled
(74) *Attorney, Agent, or Firm* — Alleman Hall Creasman & Tuttle LLP

(57) ABSTRACT

A route setting device is provided, which may include a display controller, a user interface device, a waypoint detecting module, and a route setting module. The display controller having a display screen may display map data on the display screen. The user interface device may accept a route input operation using the display screen where the map data is displayed. Processing circuitry may detect a waypoint of a ship in the map data based on a trace of the route input operation in the map data. The processing circuitry may set a route of the ship based on the waypoint.

20 Claims, 7 Drawing Sheets

ROUTE SETTING DEVICE, AUTOMATIC PILOT, AND METHOD OF SETTING ROUTE

CROSS-REFERENCE TO RELATED APPLICATION(S)

This application claims priority under 35 U.S.C. § 119 to Japanese Patent Application No. 2017-224131, which was filed on Nov. 22, 2017, the entire disclosure of which is hereby incorporated by reference.

TECHNICAL FIELD

The present disclosure relates to a route setting device which sets a route of a movable body, an autopilot provided with the route setting device, and a method of setting the route.

BACKGROUND

An autopilot (autopilot device) may be carried in movable bodies (especially, ships) for reducing burden of a steersman. As a common method of setting a route with the autopilot device, there is a method disclosed in JP2004-333464A, for example. JP2004-333464A discloses an electronic nautical chart device which sets a route on a nautical chart displayed on a display by sequentially setting veering points. This electronic nautical chart device sets straight lines which connect the set veering points as the route on which a ship travels.

JP2004-333464A set the lines which connect the points selected by a user as the route of the ship. However, if the route is changed on the way, information on the veering points up to this time point are reset and the user needs to newly set all the veering points again. Therefore, the user cannot easy and freely set the route.

SUMMARY

Thus, one purpose of the present disclosure is to provide a route setting device, an autopilot, and a method of setting a route, which can set the route easily and freely.

A route setting device according to the present disclosure is provided, which may include a display controller, a user interface device, and processing circuitry. The display controller having a display screen may display nautical chart map data on the display screen. The user interface device may accept a route input operation using the display screen where the nautical chart map data is displayed. The processing circuitry may detect a waypoint of a ship in the nautical chart map data based on a trace of the route input operation in the nautical chart map data. The processing circuitry may set a route of the ship based on the waypoint.

According to this configuration, the route can be set by, for example, sliding a finger of the user. Compared to a case of setting the route by connecting veering points which are selected by the user, the user can easily and freely, or instinctively set the route in detail.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
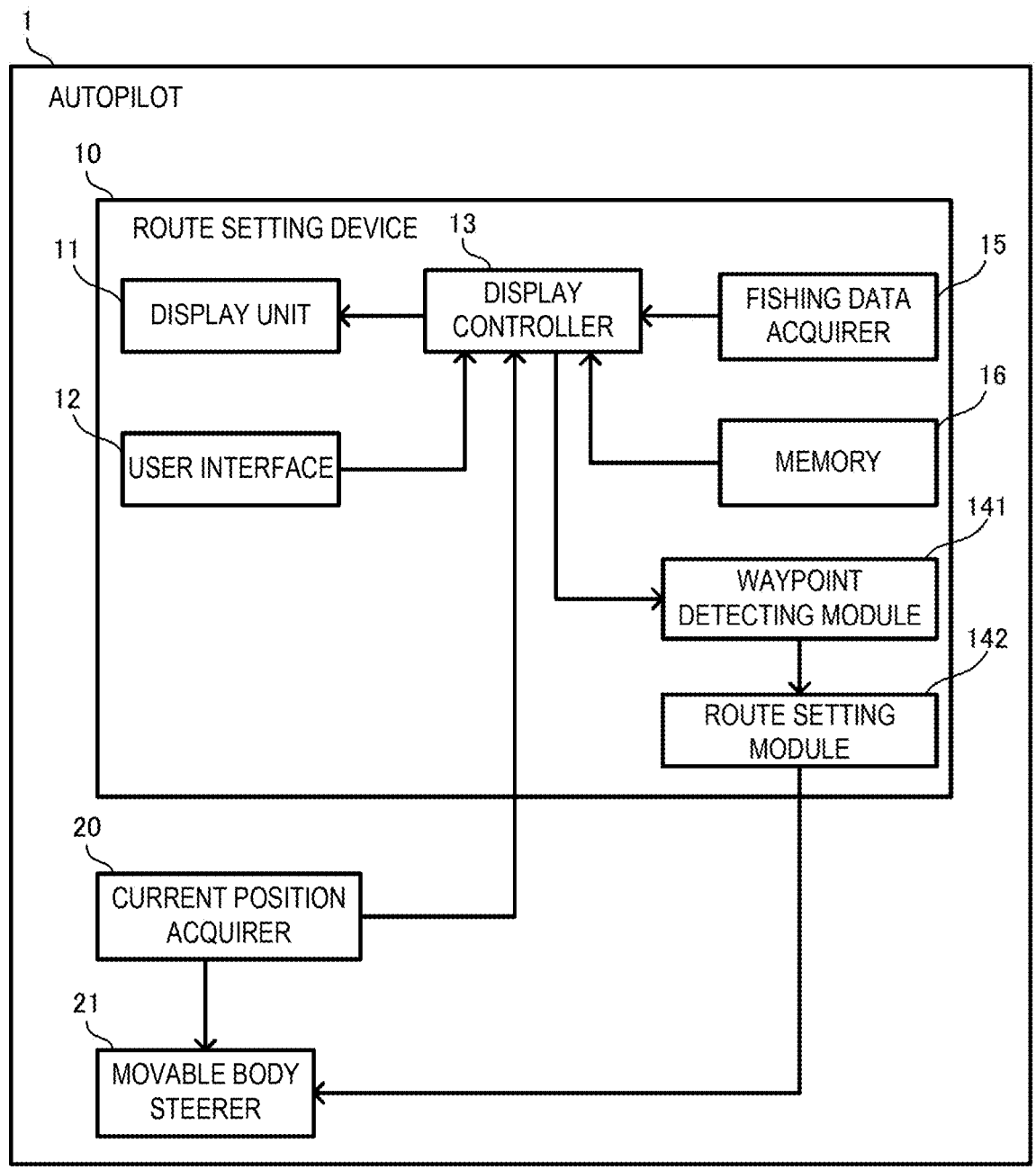
FIG. 1 is a block diagram illustrating a configuration of an autopilot device according to one embodiment.

FIG. 1 is a block diagram illustrating a configuration of an autopilot 1 according to one embodiment. The autopilot 1 may be carried in a ship, which may be referred herein to as "the ship." The autopilot 1 may be a so-called "autopilot device" which carries out autopilot of the ship according to a route which is set. The ship may correspond to a "movable body" according to the present disclosure. Note that the present disclosure may be applied to ships which typically travel on water or sea and may be referred to as surface ships, and may also be applied to other types of ships, which may include boats, dinghies, watercraft, and vessels. Further, the present disclosure may also be applied, if applicable, to submarines, aircrafts, and spaceships, as well as any types of vehicles which travel on the ground, such as automobiles, motorcycles, and ATVs.

The autopilot 1 may include a route setting device 10, a current position acquirer 20, and a movable body steerer 21. The route setting device 10 may set a route of the ship. The current position acquirer 20 may acquire current positional data of the ship which is identified by a positioning system provided to the ship. The movable body steerer 21 may steer the ship based on the position of the ship acquired by the current position acquirer 20 so that the ship travels on the route which is set by the route setting device 10.

The route setting device 10 may include, a display unit 11, a user interface (which may also be referred to as "user interface device") 12, a display controller 13, processing circuitry including a waypoint detecting module 141 and a route setting module 142, a fishing data acquirer 15, and a memory 16.

The display unit 11 may be a display which displays necessary data. The display unit 11 may be controlled by the display controller 13 (described below).

The user interface 12 may allow the user to input data. The user interface 12 according to this embodiment may be a touch panel provided over a screen of the display unit 11, and accept a touch operation and a slide operation by the user. Here, the touch operation may be operation by the user touching (contacting) the screen of the display unit 11 with his/her finger for a short period of time, and the slide operation may be operation by the user sliding his/her finger while contacting the user interface 12 to input a continuous line. This slide operation may correspond to a "route input operation" of the present disclosure.

The fishing data acquirer 15 may acquire fishing data from outside of the autopilot device. The fishing data may include data related to a water temperature, a water depth, a bottom sediment, etc. The fishing data acquirer 15 may output the acquired fishing data to the display controller 13. Note that past fish catch may also be used for the fishing data.

The memory 16 may store various kinds of necessary data, such as nautical chart data.

The display controller 13 may control displaying of the display unit 11. The display controller 13 may display the nautical chart data around and including the position of the ship acquired by the current position acquirer 20, on the display screen of the display unit 11. The display controller 13 may also display on the display screen of the display unit 11 a trace of the slide operation which is inputted through the user interface 12 by the user. When the user interface 12 accepts one slide operation and then accepts another slide operation, the display controller 13 may erase one trace of the slide operation which has been displayed and then display another trace of the latest slide operation. Images displayed by the display controller 13 will be described in detail later.

The waypoint detecting module 141 and the route setting module 142 may set the route during autopilot of the ship (autopilot route) based on the trace of the user's slide operation displayed by the display controller 13. In detail, the waypoint detecting module 141 may detect the positional data on the map data of the trace of the user's slide operation. That is, the waypoint detecting module 141 may detect the positional data of waypoints on the trace. The waypoints may be points which form the trace on the map data (points through which the user's finger passes during the slide operation), and at least include one point (position) where the trace is bent, and a start point and an end point of the trace. Here, the positional data may be latitude data and longitude data. The waypoint detecting module 141 outputs the positional data of the waypoints to the route setting module 142.

The route setting module 142 may set the route by setting so that the detected positional data are connected. The route setting module 142 may then output the set route to the movable body steerer 21.

Below, the image which is displayed by the display controller 13 on the display unit 11 is described. The display controller 13 may correspond to a "map data display module," a "trace display module," a "movable body display module," and a "movable body position acquiring module" according to the present disclosure.

Figure 2A:
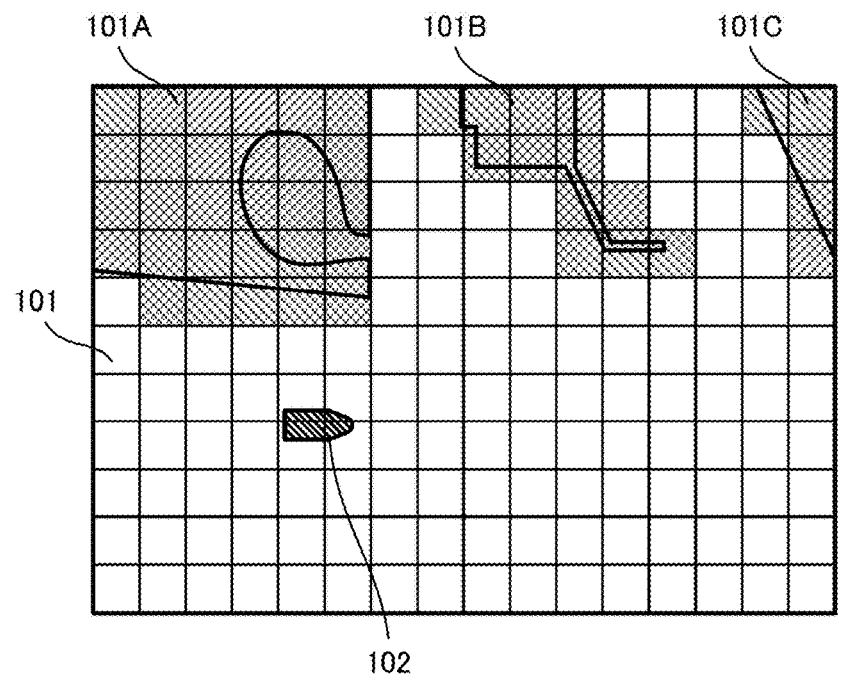
FIGS. 2(A) and 2(B) are views illustrating examples of an image displayed on a display unit.
Figure 2B:
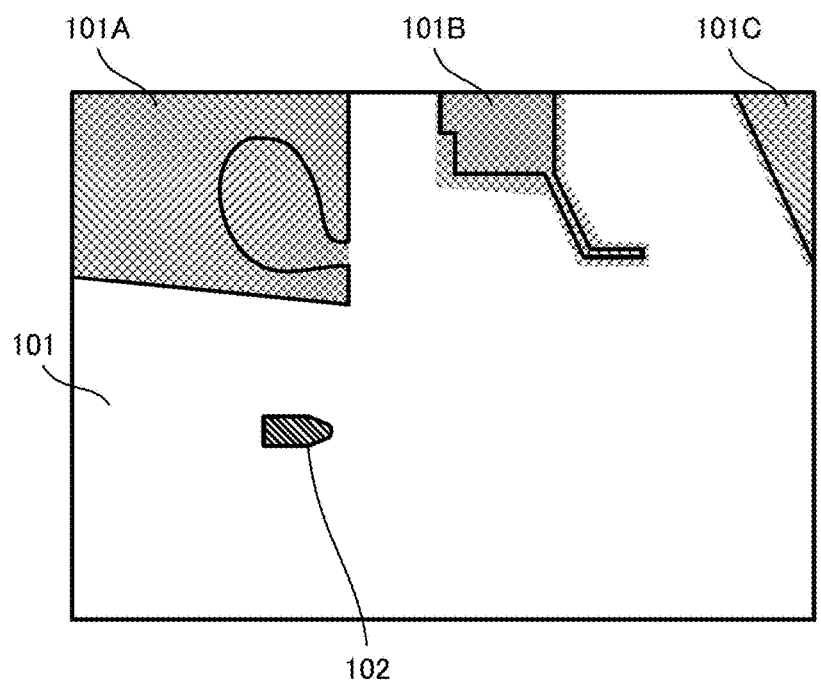

FIGS. 2(A) and 2(B) are views illustrating examples of the image displayed on the display unit 11.

As illustrated in FIG. 2(A), the display controller 13 may display nautical chart data 101 stored in the memory 16 and a plurality of grid lines on the display unit 11. Here, the display controller 13 may display the nautical chart data 101 around and including the position of the ship acquired by the current position acquirer 20. The display controller 13 may also display a symbol 102 indicative of the ship on the displayed nautical chart data 101.

When there are areas 101A, 101B and 101C where no ship can travel (untravelable area) within the displayed nautical chart data 101, the display controller 13 may change a display mode inside grids (areas divided by grid lines) covering the areas 101A, 101B and 101C. The area where no ship can travel may be, for example, land, an ocean space with possible shoal, etc. In this case, the display controller 13 may display the display color of the grids differently from other grids. Thus, when the user sets the autopilot route, he/she may easily grasp the untravelable area.

Note that the positional data of the untravelable area may be stored in the memory 16 or other storage devices before used, or the positional data of the untravelable area which is detected by an instrument carried in the ship may be acquired when necessary. Alternatively, the positional data of the untravelable area may be received outside the autopilot device.

Moreover, although not illustrated, the display controller 13 may display the fishing data acquired from the fishing data acquirer 15. For example, the display controller 13 may change the display mode of the grids, or may display character(s) to report a change in water temperature, the bottom sediment, etc. to the user.

Note that, as illustrated in FIG. 2(B), the display controller 13 may display the nautical chart data 101 without the grids.

In the image illustrated in FIG. 2(A), the user may slide his/her finger over adjacent grids continuously using the symbol 102 indicative of the ship as the start point to input the autopilot route. The display controller 13 may change the display mode of the grids over which the finger slid to display the route inputted by the user.

Figure 3A:
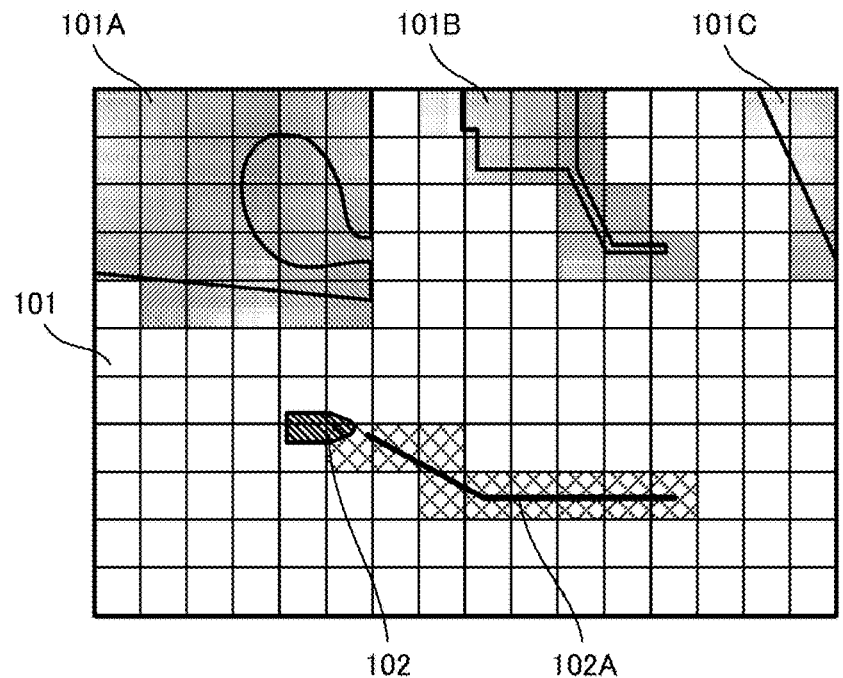
FIGS. 3(A) and 3(B) are views illustrating display modes of the display unit when setting a route during autopilot.
Figure 3B:
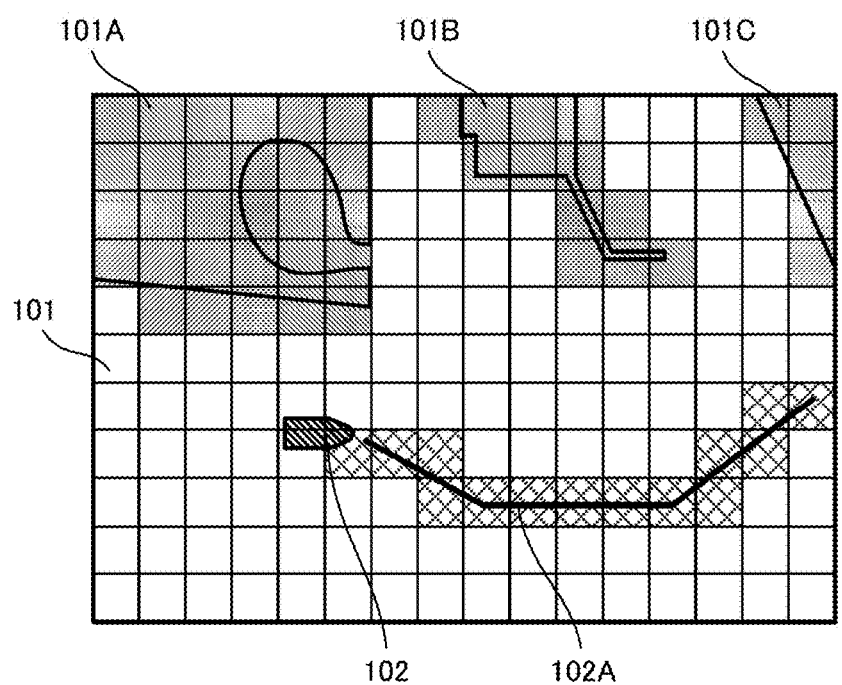

FIGS. 3(A) and 3(B) are views illustrating the display mode of the display unit 11 when the autopilot route is set.

As the user slides his/her finger over the grids sequentially, the route setting module 14 may set the trace of the slide operation by the user as the autopilot route. As illustrated in FIG. 3(A), the display controller 13 may change the color of the grid into another color sequentially as the finger passes. Thus, the user can grasp the route 102A during the autopilot which the user inputted by himself/herself.

When setting a further route from the end point of the set route 102A, the user may input the autopilot route by sliding his/her finger over adjacent grids continuously by using the end point of the route 102A as a new start point. As illustrated in FIG. 3(B), the display controller 13 may further change the color of the grids. Thus, the user can grasp the route 102A which is extended.

Thus, the user can easily set the autopilot route only by sliding his/her finger on the display screen of the display unit 11 which displays the nautical chart data. In addition, compared with the conventional art in which the autopilot route is set as the lines which connect the veering points selected by the user, the user can set the route easier and more freely. In addition, even if the user wants to extend the route, the already-set route can easily be extended by further sliding his/her finger over the grids from the end point of the already-set route.

Below, a case where the already-set autopilot route is changed is described. When changing the already-set route 102A, the user may again input the autopilot route by again sliding his/her finger continuously over adjacent grids. In this case, the route setting module 142 may cancel the already-set route, and then set the latest inputted route as the autopilot route.

Figure 4:
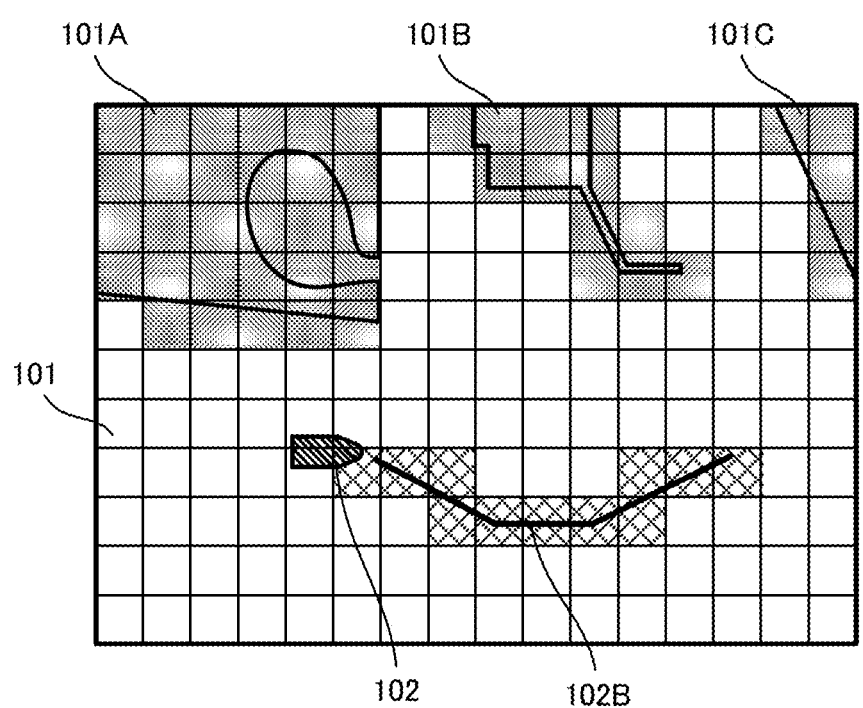
FIG. 4 is a view illustrating a display mode of the display unit when changing the route by using the ship as a start point.

FIG. 4 is a view illustrating a display mode of the display unit 11 when changing the route by using the ship as the start point. In this case, the display controller 13 may erase the display of the route 102A illustrated in FIG. 3(A), and as illustrated in FIG. 4, it may display a newly inputted route 102B which extends from the symbol 102 of the ship.

Figure 5:
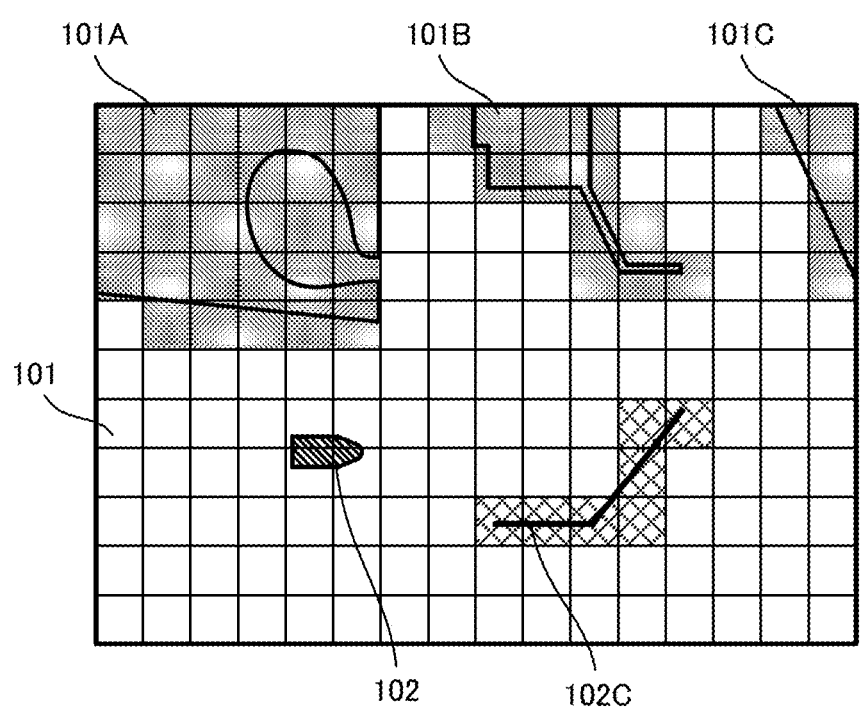
FIG. 5 is a view illustrating another display mode of the display unit when changing the route without using the ship as the start point.

FIG. 5 is a view illustrating a display mode of the display unit 11 when changing the route without using the ship as the start point. In this case, the start point of the slide operation may be a point at an intermediate location of the already-set route 102A or a point which is apart from the route 102A. As illustrated in FIG. 5, the display controller 13 may display a newly inputted route 102C by using a first-touched grid as the start point.

Note that, the symbol 102 of the ship and the start point of the route 102C may be apart from each other in FIG. 5. In this case, the ship may be steered to the start point of the route 102C along the route which is automatically set by the movable body steerer 21, or the user himself/herself may steer the ship to the start point of the route 102C.

Thus, even if the autopilot route has once been set, the autopilot route can easily be changed by again sliding his/her finger on the screen.

Note that the display controller 13 may change an interval of the grid lines to display. For example, the display controller 13 may change the interval of the grid lines according to a turnable angle of the ship. In this case, it can avoid a possibility that the ship is impossible to turn and travel on the set route after the route is set. Alternatively, the interval of the grid lines may be changed according to a display range.

Alternatively, the interval of the grid lines may be changed according to the existence of obstacle(s) around the ship, or may be irregular intervals. For example, the intervals of the grid lines may be narrowed in an area with many obstacles, and may be widened in an area with fewer obstacles. Alternatively, the interval of the grid lines in a congestion area may be narrower than other areas.

When the interval of the grid lines is narrowed, the fine setting of the route is possible, but the ship may be unable to travel on the set route, depending on current or wind conditions. In this case, by setting the interval of the grid lines wider, the ship can travel along the set route even if the ship is drifted by the current etc.

Alternatively, the display controller 13 may change the interval of the grid lines by operation of the user through the user interface 12.

Figure 6:
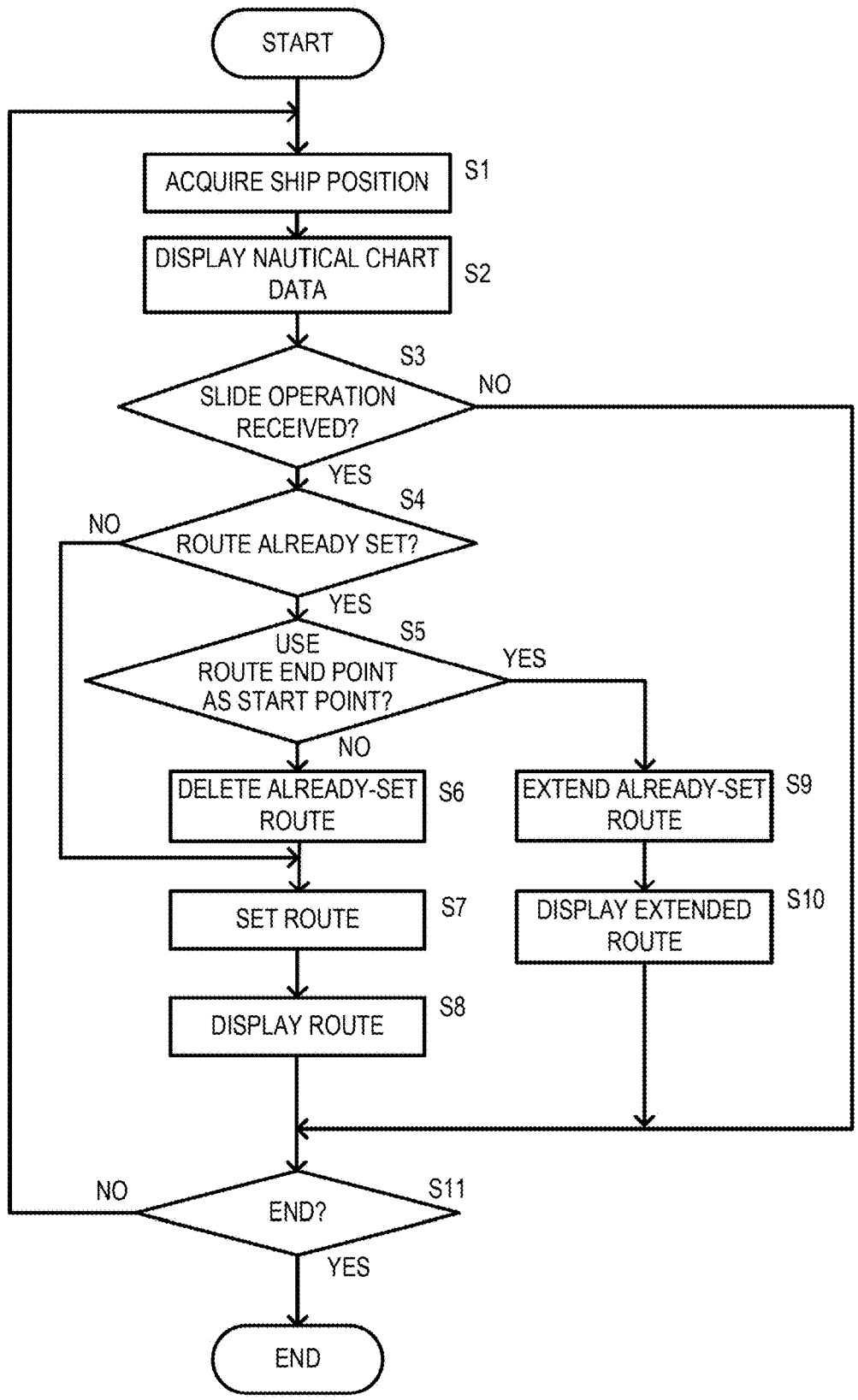
FIG. 6 is a flowchart illustrating processing executed by the autopilot device.

FIG. 6 is a flowchart illustrating processing executed by the autopilot 1.

The current position acquirer 20 may acquire the positional data of the ship identified by the positioning system (S1). The display controller 13 may display the nautical chart data 101 (see FIG. 2(A)) including the position of the ship acquired by the current position acquirer 20 (S2: map data displaying step). Here, the display controller 13 may display the nautical chart data 101 as well as the grid lines. Moreover, when there are the untravelable areas (e.g., 101A, 101B and 101C) on the nautical chart data, the display controller 13 may change the display mode of the grids within included in the areas 101A, 101B and 101C.

The user interface 12 may determine whether the slide operation by the user is received (S3: receiving step). If the user interface 12 has not received the slide operation (S3: NO), processing of S11 (described below) may be performed. If the user interface 12 receives the slide operation (S3: YES), the route setting module 142 may determine whether the autopilot route has already been set (S4).

If the route has already been set (S4: YES), the route setting module 142 may determine whether the slide operation inputted through the user interface 12 is to use the end point of the already-set route as the start point (S5). If the slide operation is to use the end point of the already-set route as the start point (S5: YES), the route setting module 142 may extend the already-set route (S9), and the display controller 13 may display the extended route, as illustrated in FIG. 3(B) (S10). Then, the processing of S11 may be performed.

At S5, if the slide operation is not to use the end point of the already-set route as the start point (S5: NO), the route setting module 142 may delete the already-set route (S6). Then, the route setting module 142 may set the newly inputted route as the autopilot route (S7: route setting step), and the display controller 13 may display the route on the display unit 11, as illustrated in FIG. 4 or 5 (S8: trace displaying step).

At S4, if the route has not yet been set (S4: NO), the route setting module 142 may set the trace of the slide operation received at S3 as the autopilot route (S7), and the display controller 13 may display the route on the display unit 11 (S8).

The autopilot 1 may determine whether the entire processing is to be ended by, for example, detecting a turn-off of the power (S11), and if it ends (S11: YES), the autopilot 1 may end the entire processing. If the autopilot 1 does not end (S11: NO), it may again perform from the processing of S1.

As described above, in this embodiment, the autopilot route can be set easily and freely by sliding the finger on the display unit 11 which displays the nautical chart data. In addition, even if the route has once been set, the route can again be set easily by sliding the finger on the display unit 11.

Note that, although the user interface 12 is the touch panel, it may be a mouse. In this case, the autopilot route may be inputted by manipulating a pointer displayed on the display unit 11 with the mouse. In this case, the operation of the pointer with the mouse corresponds to the "route input operation" of the present disclosure.

Figure 7A:
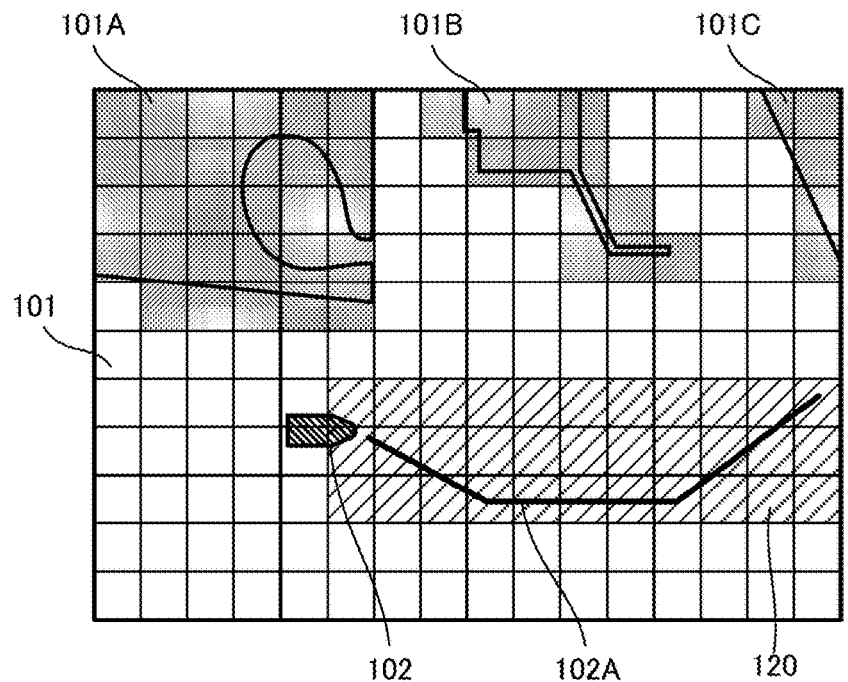
FIGS. 7(A) and 7(B) are views illustrating display modes of the display unit when travel permitted ranges are set.
Figure 7B:
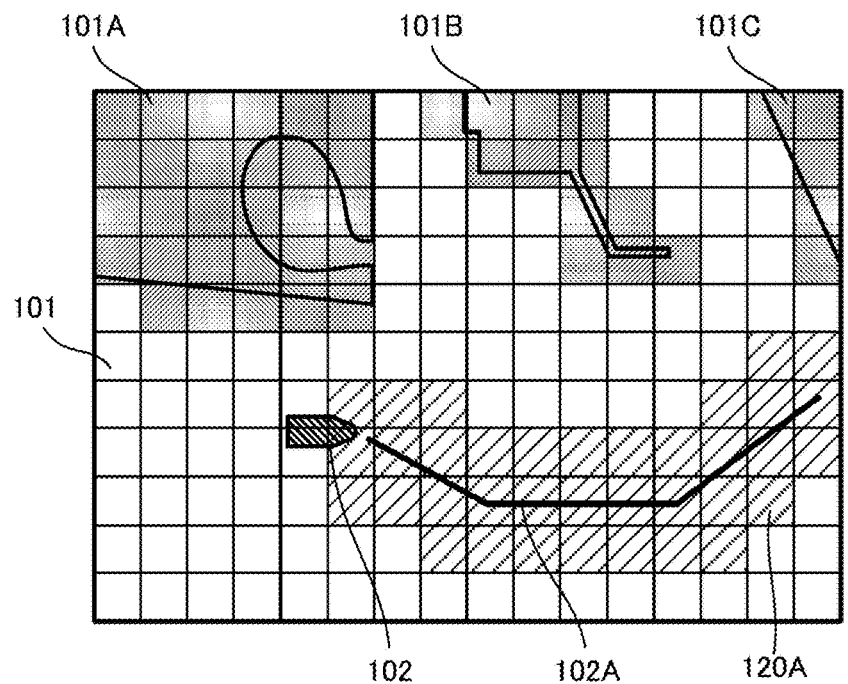

Note that, in the above description, the mode in which the route is set by sequentially connecting the grids over which the finger slid is illustrated. However, the travel permitted range may be set based on the grids over which the finger slid, and the autopilot may be set within the travel permitted range. FIGS. 7(A) and 7(B) are views illustrating display modes of the display unit 11 when the travel permitted range is set.

In the case of FIG. 7(A), the route setting module 142 may set a rectangular-shaped travel permitted range 120. For example, the route setting module 142 may detect a plurality of grids over which the finger slid.

The route setting module 142 may detect the grids at both ends in the lateral directions and both ends in the vertical directions among the grids. For example, the route setting module 142 may detect the grid at each end based on the start point, the end point, and the bent point(s) which are the waypoints. The route setting module 142 may set as the travel permitted range 120 the minimum rectangular area containing the grids at both ends in the lateral directions and both ends in the vertical directions.

In the case of FIG. 7(B), the route setting module 142 may set a travel permitted range 120A having given margins in the width directions for each of the plurality of grids over which the finger slid. For example, the route setting module 142 may detect the plurality of grids over which the finger slid.

The route setting module 142 may set a primary traveling direction, for example, based on the arrangement of the plurality of grids. For example, in the case of FIG. 7(B), since most of the plurality of grids over which the finger slid are located in the lateral directions, the primary traveling direction may be the lateral direction.

The route setting module 142 may set the margin of one grid at both sides in the direction perpendicular to the primary traveling direction. The route setting module 142 may set the travel permitted range 120 based on the plurality of grids over which the finger slid and the margin grids for each grid.

The permitted range for the route can be made broader by performing such processing. Therefore, the autopilot which is difficult to deviate from the route can be achieved.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, micro-controlling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A route setting device, comprising:
   a display controller having a display screen and configured to:
      display nautical chart map data on the display screen, and
      display grid lines on the display screen together with the nautical chart map data;
   a user interface device configured to accept a route input operation, using the display screen where the nautical chart map data is displayed, of continuously touching adjacent areas among two or more grids divided by the grid lines; and
   processing circuitry configured to:
      set a travel permitted range including a plurality of trace areas having grid lines touched by the route input operation and given margin areas which are adjacent to each of the plurality of trace areas.

2. The route setting device of claim 1, wherein a distance between the grid lines is changeable.

3. The route setting device of claim 2, wherein the processing circuitry sets the travel permitted range based on a plurality of areas corresponding to the route input operation, and sets the route according to the travel permitted range.

4. The route setting device of claim 1, further configured to display the trace of the route input operation on the display screen.

5. The route setting device of claim 1, wherein the route input operation is a slide operation on the display screen.

6. The route setting device of claim 1, further configured to:
   acquire a position of a ship; and
   display a symbol representing the ship at a position on the display screen corresponding to the position of the ship on the nautical chart map data.

7. The route setting device of claim 1, wherein the display controller changes a display mode of an untravelable area within the displayed nautical chart map data.

8. The route setting device of claim 1, wherein, when the user interface device accepts at least two route input operations in sequence, the display controller displays on the display screen only the trace of a latest route input operation accepted by the user interface device, and
   wherein the processing circuitry sets the trace of the latest route input operation accepted by the user interface device as a new route.

9. The route setting device of claim 1, further comprising a fishing data acquirer configured to acquire fishing data,
   wherein the display controller changes color of the grid lines according to the fishing data.

10. An autopilot device, comprising:
    the route setting device of claim 1; and
    a movable body steerer configured to cause the ship to travel along the route set by the route setting device.

11. The route setting device of claim 1, wherein a distance between the grid lines is changeable.

12. The route setting device of claim 1, wherein the processing circuitry sets the travel permitted range based on a plurality of areas corresponding to the route input operation, and sets the route according to the travel permitted range.

13. The route setting device of claim 1, further configured to display the trace of the route input operation on the display screen.

14. The route setting device of claim 1, further configured to display the trace of the route input operation on the display screen.

15. The route setting device of claim 1, wherein the route input operation is a slide operation on the display screen.

16. The route setting device of claim 1, further configured to:
    acquire a position of the ship; and
    display a symbol representing the ship at a position on the display screen corresponding to the position of the ship on the nautical chart map data.

17. The route setting device of claim 1, wherein the processing circuitry is further configured to:
    set traveling directions based on the route input operation; and
    set the given margin areas of a grid at both sides in the direction perpendicular to the traveling directions.

18. The route setting device of claim 17, wherein the processing circuitry is further configured to display an untravelable area having a plurality of grids in which a ship cannot travel.

19. The route setting device of claim 18, wherein the processing circuitry is further configured to display the plurality of grids of the untravelable area in a display color different from a display color of the grid lines of the travel permitted range.

20. A method of setting a route, comprising the steps of:
    displaying nautical chart map data on a display screen;
    displaying grid lines on the display screen together with the nautical chart map data;
    accepting a route input operation, using the display screen where the nautical chart map data is displayed, of continuously touching adjacent areas among two or more grids divided by the grid lines; and
    setting a travel permitted range including a plurality of trace areas having grid lines touched by the route input operation and given margin areas which are adjacent to each of the plurality of trace areas.

* * * * *